United States Patent Office 3,502,523
Patented Mar. 24, 1970

3,502,523
ORIENTED POLYAMIDE ARTICLE CONTAINING POLYETHYLENE
Arthur N. Ingalls, Vienna, W. Va., and Gerald G. Hayes, Camden, S.C., assignors to E. I. du Pont de Nemours and Company, Wilmington, Del.
No Drawing. Filed Aug. 14, 1967, Ser. No. 660,228
Int. Cl. B29c 27/08
U.S. Cl. 156—73     3 Claims

ABSTRACT OF THE DISCLOSURE

Oriented polyamide articles, such as strapping and power transmission belting, exhibit improved friction weldability and resistance to delamination when the polyamide resin from which the article is formed is blended with from 0.20 to 3.0% by weight of branched polyethlyene resin and the resultant blend is thereafter formed into the oriented article.

---

This invention relates to improvements in oriented articles made from polyamide resin, and more particularly to a method and composition for improving physical properties of such articles.

Polyamide resin can be melt fabricated into an elongated shape such as that of a ribbon and thereafter longitudinally oriented to form useful articles such as power transmission belting and strapping, disclosed in U.S. Patent No. 2,999,764 to J. E. Rhoads, and British Patent No. 1,017,175 to Du Pont, respectively. Unfortunately, as the degree of orientation of the polyamide ribbon increases, certain characteristics appear which may hamper its utility. For example, the resistance to longitudinal splitting of the oriented article decreases, which may be deleterious to the resistance to delamination desired for use as power transmission belting. For strapping, a new technique for joining the strapping to itself has been developed, which is called friction welding. Friction welding is described in a publication by Signode Corporation, identified as SPD 360 7/66–10M–A and entitled "An Introduction to Tension Weld—the Process, the Tool, the Weld Itself." This method of bonding generally involves the rubbing together of overlapping ends of strapping while under tension, with the ends being pressed together under sufficient pressure and for a sufficient duration to cause localized melting and allowing these molten areas to weld the overlapping ends together. While such welding as applied to polyamide strapping does not significantly destroy its orientation, the strength of the weld is relatively low and impairs the strength-in-use to that extent.

It has now been found that when a small amount of branched polyethylene resin is incorporated in the polyamide resin to be used for forming an oriented article thereof, the oriented article exhibits improved friction weldability and resistance to longitudinal splitting, as compared to the same oriented article made entirely of polyamide resin. The amount of branched polyethylene resin required will range from 0.2 to 3.0 percent by weight based on the weight of the resultant blend when improved friction weldability is desired. Higher amounts tend to decrease the friction weldability of the oriented article. When friction welding is not to be applied to the oriented article, e.g., its ends are complementarily beveled and fastened together with adhesive so as to be useful as power transmission belting, up to 5.0% by weight of the branched polyethylene can be present. For either type application, amounts smaller than 0.2% by weight do not show any significant improvement, and from 0.5 to 2.0% by weight of branched polyethylene resin is preferred.

The branched polyethylene resin is a well-known article of commerce. It is frequently called low density polyethylene, with the density being from about 0.900 to 0.935 g./cc. measured according to ASTM D–792. It is desirable that the branched polyethylene resin have sufficient molecular weight to be tough; a melt index between about 0.2 to 2.0 measured according to ASTM D–1238 is preferred. Linear or high density polyethylene resin has a detrimental effect on properties of the oriented polyamide article.

The polyamide resins are well-known articles of commerce, and generally have a moleculer weight in excess of about 2000. The particular resin selected should be capable of sufficient orientation to provide the strength required for the application involved. Representative polyamide resins include polyhexamethylene adipamide, polyhexamethylene sebaceamide, polycaprolactam and copolymers thereof. The polyamide resins can include such additives as plasticizers, antioxidants, and other conventional additives, such as described in British Patent No. 1,017,175.

For the strapping application, it is generally desirable to have the strapping colored. This can be accomplished by blending the polyamide resin, branched polyethylene resin, and colorant together before fabrication into the ribbon shape and orientation thereof. The amount of colorant employed will depend on the colorant used and the particular color intensity desired. Carbon black is the colorant most often used. In a preferred embodiment, the colorant and branched polyethylene resin are preblended to form a color concentrate and sufficient of this concentrate is then blended with the polyamide resin to supply the branched polyethylene component of the blend.

The amount of colorant present in the concentrate will generally fall between 5 and 60 percent by weight based on the weight of the concentrate, with the exact amount used being dependent on the dispersibility of the colorant in the branched polyethylene resin and on the color level desired in the polyamide strapping. Generally, sufficient colorant to opacify the polyamide strapping is desired. From 0.1 to 0.5% by weight of colorant based on the weight of the blend is usually satisfactory; higher amounts can be used, e.g., up to 2.0% by weight, can be used to improve weatherability.

Blends of this invention can be prepared by conventional methods. For example, color (or additive) concentrates can be prepared by mixing together colorant and branched polyethylene resin in a Banbury mixer or on a two-roll mixer at temperatures of about 150° C. for a sufficient time to obtain uniform dispersion. The concentrate can then be comminuted into granules of convenient size for either dry or melt blending with polyamide resin. The same technique can be used for blending branched polyethylene resin without colorant with polyamide resin. The melt blend can either be extruded into the ribbon shape for orientation or the extrudate can be comminuted into granules for re-extrusion or molding by other methods. The ribbon shape is preferably made by the process disclosed in U.S. patent application Ser. No. 619,994, filed Mar. 2, 1967, by Fields and Hartig.

The present invention is not limited to any particular form of longitudinal orientation of the polyamide-branched polyethylene resin blend. The preferred orientation, however, is the roll orientation disclosed in British Patent No. 1,017,175. Other methods of orientation such as stretching and die drawing can be used individually or in combination with each other or with roll orientation. In any event, the degree of longitudinal orientation is generally sufficient so that the oriented article has a tensile strength of at least 30,000 p.s.i. measured on a conventional test machine. This corresponds to a deformation ratio of at least about 3 (weight per unit length before orientation ÷ weight of same length after orientation). Generally, for use as the power transmission belting, the tensile strength is between 40,000 to 55,000 p.s.i. For use as strapping, the tensile strength of the oriented article is generally greater than 55,000 p.s.i.

Dimensions in inches of the oriented articles for use in power transmission belting are generally as follows: thickness of at least 0.006 and most often between 0.015 and 0.030, width of at least 0.500 and most often between 2 and 4. For definition purposes, "power transmission belting" is used herein to refer to the oriented polyamide article by itself instead of as a layer thereof laminated to a wear surface material such as leather or polyurethane. For strapping, the oriented article will have a thickness of greater than 0.010 and width generally between 0.25 and 0.75. All dimensions are in inches.

The following examples are illustrative of the present invention; however, the invention is not intended to be limited to these examples. Parts and percents are by weight and weight percents are based on total weights unless otherwise indicated. The melt indices, densities, and tensile strengths are determined under the conditions and procedures hereinbefore described.

EXAMPLES 1 TO 3

A control oriented article is made as follows: polyhexamethylene adipamide having a relative viscosity of about 50 obtained in accordance with ASTM D-789 and containing carbon black is extruded in the form of a ribbon which is roll-oriented and stretched in accordance with British Patent No. 1,017,175 to produce an oriented article having a deformation ratio of about 4.3 and having a cross-section of ½ x 0.020 inch.

Additional oriented articles of the same dimensions are made using the same degree of roll-orientation and the same polyamide resin but containing branched polyethylene resin. The polyamide resin containing the carbon black is melt blended with branched polyethylene resin and the resultant blend is extruded, cooled and comminuted into granules which are re-extruded into a ribbon and roll oriented. Additional details on composition and test results are given in Table I.

TABLE I

| Example | Polyethylene in blend | | | Carbon black, wt. percent | Tensile strength p.s.i. |
| | Wt. percent | Melt index | Density, g cc. | | |
|---|---|---|---|---|---|
| 1 | 0 | | | 0.125 | 71,200 |
| 2 | 1.8 | 0.25 | 0.919 | 0.125 | 66,300 |
| 3 | 0.9 | 0.25 | 0.919 | 0.125 | 67,400 |

The oriented articles of these examples are useful as strapping. When used for this purpose and the ends of the strapping friction-welded together, the strapping of Example 1 has a joint strength (strength of bond) of 236 lbs., whereas the strapping of Examples 2 and 3 have joint strengths of 380 and 308 lbs., respectively. The friction weld is obtained using a commercially available friction welding tool described in the Signode publication operating at 6000 strokes/min. and 100 p.s.i.

EXAMPLE 4

Example 2 is duplicated except that the carbon black content is increased to 0.46 percent and the polyamide resin containing the carbon black and the polyethylene resin ingredients are first dry blended and then extruded to the ribbon shape. The tensile strength of the strapping is 66,200 p.s.i. and the friction-welded joint strength is 390 lbs.

EXAMPLES 5 TO 8

The same blending procedure as Example 4 is followed for these examples to make strapping of the same orientation and polyamide resin, but unpigmented, as Examples 1 to 3, except that the branched polyethylene resin and carbon black and other ingredients are pre-blended, melt extruded and comminuted into granules. The polyethylene content and carbon black content in the polyamide resin is varied by varying the amount of pre-blend or concentrate blended therewith. The concentrate consists of 20 percent carbon black, 78.8 percent branched polyethylene, 0.4 percent BaCO₃, and 0.8 percent of an antioxidant available as Santonox AO-3. Santonox AO-3 is 4,4'-thiobis(6-t-butyl-3-methyl phenol). Further details and test results for these examples are found in Table II.

TABLE II

| Example | Polyethylene in blend | | | Carbon black, wt. percent | Tensile strength p.s.i. |
| | Wt. percent | Melt index | Density, g cc. | | |
|---|---|---|---|---|---|
| 5 | 1.75 | 0.24 | 0.917 | 0.44 | 65,900 |
| 6 | 1.10 | 0.24 | 0.917 | 0.28 | 64,900 |
| 7 | 0.32 | 0.24 | 0.917 | 0.08 | 67,000 |
| 8 | 0.28 | 0.24 | 0.917 | 0.07 | 68,700 |

A control strapping is made containing the same polyamide resin with 0.125 percent of carbon black and no branched polyethylene resin. This strapping has a tensile strength of 68,600 p.s.i. and a joint strength of 230 lb. The friction weld joint strength of the strapping of Examples 5, 6, 7 and 8 are 344, 318, 314 and 286 lbs., respectively.

When the oriented articles of the foregoing examples are used in the manner of power transmission belting, they exhibit greater resistance to delamination than belting made from the control articles.

As many apparently widely different embodiments of this invention may be made without departing from the spirit and scope thereof, it is to be understood that this invention is not limited to the specific embodiments thereof, except as defined in the appended claims.

What is claimed is:

1. In the process of friction welding polyamide strapping to fasten it under tension about an article, the improvement comprising conducting said process with said strapping wherein the polyamide resin from which the strapping is made is a blend containing from 0.2 to 3% by weight, based on the total weight of the blend, of branched polyethylene resin, said strapping having a deformation ratio of at least about 3 and said polyethylene resin having a density of from 0.900 to 0.935.

2. The process of claim 1 wherein the blend contains 0.5 to 2% by weight, based on the total weight of the blend, of said branched polyethylene resin.

3. The process of claim 1 wherein said branched polyethylene resin is blended with colorant prior to incorporation in the blend.

References Cited

UNITED STATES PATENTS 3,093,255  6/1963  Mesrobian _____ 260—857

FOREIGN PATENTS 740,501  8/1960  Canada.

SAMUEL H. BLECH, Primary Examiner

PAUL LIEBERMAN, Assistant Examiner

U.S. Cl. X.R.

74—570; 156—304, 308; 260—78, 94.9, 41